(12) United States Patent
Palumbo

(10) Patent No.: US 6,592,686 B2
(45) Date of Patent: *Jul. 15, 2003

(54) LEAD AND LEAD ALLOYS WITH ENHANCED CREEP AND/OR INTERGRANULAR CORROSION RESISTANCE, ESPECIALLY FOR LEAD-ACID BATTERIES AND ELECTRODES THEREFOR

(75) Inventor: Gino Palumbo, Etobicoke (CA)

(73) Assignee: Integran Technologies Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/935,704

(22) Filed: Aug. 24, 2001

(65) Prior Publication Data

US 2002/0050311 A1 May 2, 2002

Related U.S. Application Data

(63) Continuation of application No. 09/412,610, filed on Oct. 6, 1999, now Pat. No. 6,342,110, which is a continuation-in-part of application No. 08/977,518, filed on Nov. 24, 1997, now abandoned, which is a continuation-in-part of application No. 08/835,926, filed on Apr. 8, 1997, now abandoned, which is a continuation of application No. 08/609,327, filed on Mar. 1, 1996, now abandoned.

(51) Int. Cl.$^7$ .............................................. C22C 11/00
(52) U.S. Cl. ...................... 148/400; 148/706; 420/590
(58) Field of Search ................................ 148/400, 706; 420/590

(56) References Cited

U.S. PATENT DOCUMENTS

| 4,978,601 | A | * | 12/1990 | Kim et al. ........................ 29/2 |
| 5,434,025 | A | * | 7/1995 | Rao et al. ................... 429/226 |
| 6,342,110 | B1 | * | 1/2002 | Palumbo .................... 148/400 |

FOREIGN PATENT DOCUMENTS

| EP | 0 933 438 A1 | 8/1999 | .......... C21D/10/00 |
| WO | WO 01/90433 A2 | 11/2001 | |

OTHER PUBLICATIONS

JP 59 107068 (Hitachi Seisakusho KK) Jun. 21, 1984.

JP 59 013057 A (Tokyo Shibaura Denki KK) Jan. 23, 1984.

* cited by examiner

*Primary Examiner*—Roy King
*Assistant Examiner*—Andrew Wessman
(74) *Attorney, Agent, or Firm*—Bacon & Thomas

(57) ABSTRACT

Recrystallized lead and lead alloy positive electrodes for lead acid batteries having an increased percentage of special grain boundaries in the microstructure, preferably to at least 50%, which have been provided by a process comprising steps of working or straining the lead or lead alloy, and subsequently annealing the lead or lead alloy. Either a single cycle of working and annealing can be provided, or a plurality of such cycles can be provided. The amount of cold work or strain, the recrystallization time and temperature, and the number of repetitions of such steps are selected to ensure that a substantial increase in the population of special grain boundaries is provided in the microstructure, to improve resistance to creep, intergranular corrosion and intergranular cracking of the electrodes during battery service, and result in extended battery life and the opportunity to reduce the size and weight of the battery.

23 Claims, 7 Drawing Sheets

LEAD AND LEAD ALLOYS WITH ENHANCED CREEP AND/OR INTERGRANULAR CORROSION RESISTANCE, ESPECIALLY FOR LEAD-ACID BATTERIES AND ELECTRODES THEREFOR

CROSS-REFERENCE TO RELATED APPLICATIONS

This application is a continuation of application Ser. No. 09/412,610 filed on Oct. 6, 1999, now U.S. Pat. No. 6,342,110, which is a Continuation-in-Part of application Ser. No. 08/977,518 filed on Nov. 24, 1997, (abandoned) which is a Continuation-in-Part of application Ser. No. 08/835,926 filed Apr. 8, 1997 (abandoned), which is a Continuation of application Ser. No. 08/609,327 filed Mar. 1, 1996 (abandoned).

FIELD OF THE INVENTION

This invention relates to wrought and recrystallized lead and lead alloys, with increased resistance to creep and intergranular cracking and corrosion. This invention is more particularly concerned with positive lead and lead alloy electrodes used in lead-acid batteries which, via recrystallization treatment to generate new grain boundaries in the microstructure, have improved resistance to corrosion and growth, so as to provide enhanced battery reliability, extended service life and greater energy density.

BACKGROUND OF THE INVENTION

Intergranular degradation (i.e., creep deformation, cracking and corrosion) of lead-based positive electrode materials are the principal cause of premature failure of lead-acid batteries. Intergranular corrosion occurs from the change in volume associated as $PbSO_4$ is deposited in grain boundaries intersecting the surface (during discharge) and is transformed to $PbO_2$ during the charging cycle. As intergranular corrosion occurs, the lead-based electrodes break down and the performance of the battery deteriorates.

Creep deformation, which arises primarily from grain boundary sliding processes, results in dimensional expansion of the positive electrode. a so-called "growth" which causes: (1) loss of contact between the electrode surface and the $PbO_2$ paste and/or (2) contact/shorting between adjacent electrodes leading to losses in capacity. The growth of the positive electrode also contributes to intergranular "cracking".

Growth of the positive electrode in lead-acid batteries has become the predominant concern with automotive 'starter, lights and ignition' batteries as under-the-hood temperatures rise in modem automobiles. As a result of these intergranular degradation processes, and in order to maintain sufficient operating- and cycle-life performance, considerable thickness allowances are required on the minimum dimension of the positive electrodes, which commensurately increase the overall size and weight of the batteries.

Early improvements in positive lead electrodes were obtained by alloying the lead with: Sb, Sn, As, Ca and other elements. These efforts were made to strengthen the alloys by precipitation or age hardening, such as are disclosed in the U.S. Pat. Nos. 4,753,688 to Myers, 1,675,644 to Dean and 3,888,703 to Tilman, all of which are directed to antimony-bearing lead alloys. Precipitation and age hardening techniques require the presence of an alloying element which is not soluble in lead at ambient or operating temperature which forms a second phase in the metal. Hardening is typically achieved by straining and then heat treating the lead alloy above the solvus temperature, to solutionize the second phase, and then quenching the metal to form a supersaturated solution of the alloyed element in the lead. Over time, the alloyed element precipitates out of solution to form a second phase, preferably in the form of small precipitates, in the metal. These second phase precipitates impede dislocation motion in the metal, inhibit grain boundary sliding, and consequently strengthen and harden the material. Quenching following the heat treatment is necessary to keep the precipitate size small and effective in terms of strengthening and growth resistance. The deformation prior to heat treatment, typically achieved through cold or hot working, forms dislocations in the crystallographic structure of the metal which act as the nucleation sites for the precipitation of the second phase, and result in a more uniform precipitate distribution.

It should be noted that as a result of the relatively low melting temperature of lead and lead alloys, precipitation hardening typically occurs at room temperature. The techniques taught in the prior art, as exemplified in the above listed patents, are primarily directed to reduction of the time required to achieve optimum strength, from a few days at room temperature to a few minutes at elevated furnace temperatures.

There has also been a general recognition by the lead-acid battery industry, that wrought lead-alloys which are cold worked following casting of the molten alloys, yield enhanced growth resistance relative to lead and lead alloys which are simply cast to final shape. This performance improvement has been attributed to 'microstructural' refinement, and examples are outlined in U.S. Pat. Nos. 5,611,128 and 5,604,058 to Wirtz, which describe processes to cold roll near net shape battery electrodes from cast grid blanks. The benefits obtained from such wrought lead alloys may also be attributable to precipitation processes whereby uniform precipitate distribution is obtained by longer term aging at ambient temperature. In this regard, it should be noted that performance improvements using 'wrought' electrodes have been observed only with lead alloys containing alloy constituents such as Ca, Sn, Sb, Ba etc., which are insoluble at ambient temperature, and form precipitates on aging. Moreover, both precipitation-processed and wrought electrodes have not been shown to display any significant improvements with regard to intergranular corrosion.

Although 'precipitation hardening' processes, involving the proper choice of alloying constituents, and prior cold working to enhance the uniformity of precipitate distribution from aging at ambient or elevated temperature, undoubtedly have a beneficial impact on minimizing grid growth from grain boundary sliding (i.e., grain boundary "pinning by precipitates"). We have found that it is preferable to alter the structure of grain boundaries in the material directly, not only to impede grain boundary sliding, but also to minimize intergranular corrosion and cracking susceptibility. Unlike precipitation-based processes, such a new approach, according to the present invention, is also applicable to pure lead and lead alloys not containing precipitate-formers. This opens the way to the advantageous use of less expensive alloys.

Various studies have shown that certain special grain boundaries, described on the basis of "Coincident Site Lattice" model of interface structure (Kronberg, and Wilson. Trans. Met. Soc. AIME, 185, 501 (1949), as lying within Dq of $\Sigma$, where $\Sigma \leq 29$ and $Dq \leq 15°\Sigma_{-\frac{1}{2}}$ (Brandon, Acta Metall., 14, 1479 (1966)) are highly resistant to intergranular degradation processes such as corrosion, cracking, and grain boundary sliding; the latter being a principal contributor to creep deformation. However, these studies provide no instruction as to how to achieve a high concentration of special grain boundaries, and as noted, it is only recently that techniques such as Orientation Imaging Microscopy have become available, to enable grain boundaries to be studied. Moreover, the only means of creating new grain boundaries during solid state processing is to effect recrystallization of a material by cold working followed by suitable heat treatment; such a novel approach to the processing of lead acid battery positive electrodes therefore forms the basis of the present invention.

In previously issued U.S. Patents by one of the present inventors, U.S. Pat. Nos. 5,702,543, and 5,817,193, a thermomechanical process is disclosed for increasing the population of such special grain boundaries in commercial austenitic Fe and Ni-based stainless alloys from approximately 20–30% to levels in excess of 60%; such an increase resulting in significantly improved resistance to intergranular degradation processes such as intergranular corrosion and stress corrosion cracking. However, the process described and claimed in that patent is directed exclusively to certain austenitic stainless steels and nickel-based alloys, and not with any other metals. The intended application of such alloys and the environment they encounter in use is quite different from the harsh, acidic environment of lead-acid batteries.

SUMMARY OF THE INVENTION

In accordance with the present invention there is provided a lead or lead alloy, which has been processed to substantially increase the percentage of special grain boundaries, thereby to increase at least one of the resistance of the lead or lead alloy to creep and resistance to intergranular corrosion and intergranular cracking, wherein the lead or lead alloy has been subjected to at least one processing cycle comprising: cold working or straining the lead alloy by a substantial amount, preferably in excess of 10%; and subsequently annealing the lead alloy for a time and temperature sufficient to effect recrystallization to substantially increase the concentration of special grain boundaries.

In this specification, including the claims: a reference to lead means either pure lead or a lead alloy; a reference to cold working means any forming operation such as rolling extruding etc. conducted at ambient or room temperature, a reference to straining means application of a either a compressive or tensile plastic strain (e.g., expansion); a reference to lead alloy denotes an alloy that includes one or more specific alloying elements.

Preferably, the steps of cold working or straining the lead alloy and annealing to recrystallize the lead alloy are repeated a plurality of times. Excessive strain between recrystallization steps can have a negative effect on the present process. However, for lead alloys, unlike other metals, the inventors have surprisingly found that, at least for some alloys, a desired concentration of special grain boundaries can be obtained with a single step of cold working or straining and annealing.

The lead alloys may be comprised of at least one alloying element selected from the group comprising, tin, barium, calcium, selenium, bismuth, silver, iron, arsenic, copper and zinc, but the alloy can also include two or more alloying elements. The alloying element(s) need not be soluble in lead. In the case of substantial alloys, the lead alloy is preferably reduced in thickness or strained by approximately 10%–80% in each cold working step, and the lead alloy is then recrystallized, in the annealing step, at a temperature and time sufficient to allow recrystallization to occur, generally in the range of approximately 150° to 280° C. for 10 seconds to 10 minutes and subsequently air-cooled to ambient temperature with no quenching required. It is to be appreciated that the exact deformation and annealing temperature and time required for recrystallization and the formation of special grain boundaries will vary depending on the alloying additions and the percentages added.

Preferably, in the processed lead and lead alloys, the percentage of special grain boundaries is at least 50% of the total grain boundaries. For pure lead and many lead alloys, it has been found that the percentage of special grain boundaries in the processed lead can be increased to at least 60% of the total grain boundaries.

In accordance with another aspect of the present invention, the lead or lead alloy is subsequently processed into components for lead-acid batteries, for example electrodes. It is preferred for the lead or lead alloy to be subject, first, to processing according to the present invention, and that this processing be applied uniformly to all the lead. The degree of uniformity may depend on the method of cold working or straining the lead alloy, e.g. stamping, extrusion, rolling, expanding, forging etc., and component geometry.

DESCRIPTION OF THE DRAWINGS

For a better understanding of the present invention and to show more clearly how it may be carried into effect, reference will be made by way of example, to the accompanying drawings in which.

DESCRIPTION OF THE PREFERRED EMBODIMENTS

The present invention relates to the processing of lead and lead alloys for application as positive electrodes in lead-acid batteries in order to provide superior resistance to creep deformation (growth) and intergranular corrosion and cracking in the batteries acidic environment.

Figure 1:
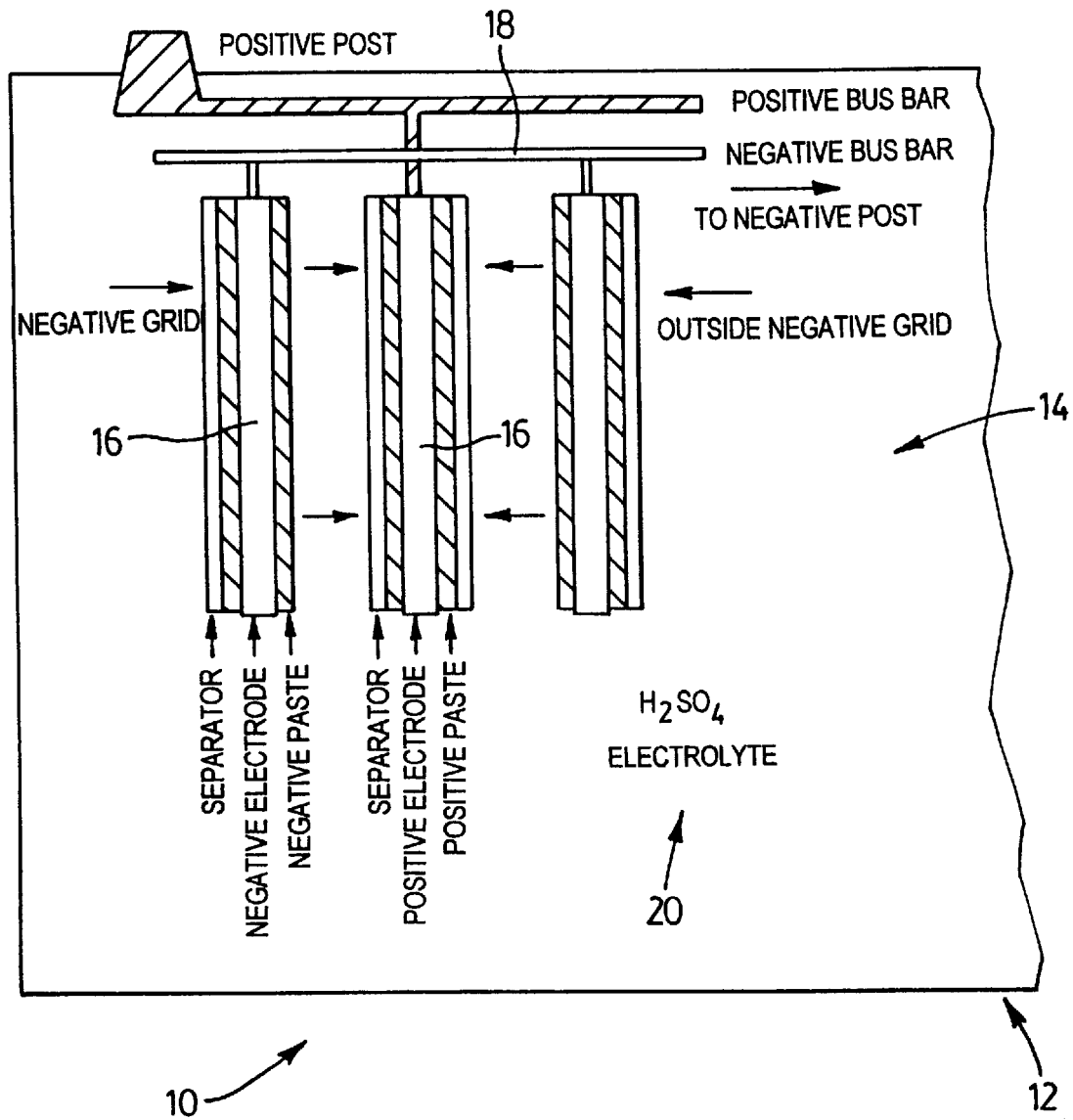
FIG. 1 is a sectional view through a conventional lead-acid battery.

Referring firstly to FIG. 1, a traditional lead-acid battery, shown generally at 10, comprises a housing 12, an internal compartment 14, electrodes 16, a busbar 18 and electrolyte solution 20. The compartment 14 serves to contain the electrolyte solution 20. Electrodes 16 and busbar 18 have traditionally been made of either a cast or wrought lead alloy Alloys are used, as opposed to pure lead, since appropriate alloying elements can provide improved strength, creep resistance and improved gassing characteristics, for example. While traditional lead-acid batteries have proven to be dependable, they have a limited life span and energy density. The limited life span is due to the creep (growth), corrosion and cracking of the electrodes resulting from successive charge-discharge cycles.

Commercially produced lead-acid battery components are generally formed initially from cast lead or lead alloys. Although cold working is also frequently applied in the rolling of cast ingots or strip to sheet, and then subsequently by slitting and straining the lead alloy sheets to form grids, full recrystallization treatments have not been used in prior lead-acid battery components. The percentage of special or coincident site lattice (CSL) grain boundaries in as cast or wrought lead-based lead-acid battery components is generally less than 20% and usually in the range of between 14% and 17%. Moreover, to applicant s knowledge no one has previously identified the significance of the special grain boundary fraction. Traditional as cast and wrought lead-based positive electrodes are susceptible to intergranular corrosion, cracking and creep deformation (growth).

In the present invention, the lead alloy positive electrode components of the battery are provided with a metallurgical microstructure having a high percentage, that is over 50%, of special grain boundaries Special grain boundaries can be defined crystallographically as lying within $$Dq \leq 15° \Sigma^{-1/2} \tag{1}$$

(D. G. Brandon: Acta. Metallurgica. Vol 14, Page 1479, 1966)

of specific coincident site lattice misorientations having $\Sigma \leq 29$. In this specification, including the claims, the term special grain boundaries defines grain boundaries having $\Sigma \leq 29$ and complying with equation 1.

The method of the present invention comprises processing the lead-based positive electrode components to maximize the concentration of special grain boundaries. More particularly, this is achieved without invoking conventional strengthening mechanisms, such as precipitation hardening, and without substantially altering the strength or hardness of the material. The process is referred to as Grain Boundary Engineering (GBE). It has been discovered that lead-based positive electrode components having concentrations of special grain boundaries greater than 50% show markedly improved resistance to creep deformation and intergranular corrosion. As a result, lead-acid batteries having grain boundary engineered lead-based positive electrode components will have improved life spans. Furthermore, as a result of reduced material allowances for degradation by creep and intergranular attack, it is possible to reduce the thickness of the electrodes, and thereby increase the energy density of the batteries.

Palumbo et. al. in Grain Boundary Design and Control for Intergranular Stress Corrosion Resistance, Scripta Metallurgica et Materialia, 25, 1775, (1991) and Lehockey et al. in On the Relationship Between Grain Boundary Character Distribution and intergranular Corrosion Proceedings of Microscopy and Microanalysis 1996 (G. W. Bailey et al. eds.) San Francisco Press Inc. (1996), p.346, have proposed generic models for intergranular corrosion and cracking, respectively. The contents of these articles are hereby incorporated by reference. However, these articles solely proposed theoretical models and did not suggest any applicability to lead, and more particularly, like other known art, contained no direction as to how to increase the concentration of special grain boundaries. The present inventors have now discovered that these models can be used in the design of lighter weight and more compact lead-acid batteries, on the basis that the frequency of special grain boundaries in lead-acid battery positive electrodes governs its susceptibility to cracking (and loss of electrical continuity) and corrosion (loss of minimum wall thickness) and can be shown to be directly related to overall battery cycle life.

In quantifying the effect of grain size and 'special' grain boundary (i.e., $\Sigma \leq 29$) frequency on bulk intergranular cracking susceptibility it can be considered that a crack initiating at the surface of the positive electrode and propagating intergranularly into the electrode, will arrest at a triple junction when both of the available intergranular paths for crack continuation are inaccessible owing to either (1) intrinsic resistance to cracking (e.g., low $\Sigma$ CSL special grain boundary) or (2) unfavourable orientation to the applied stress axis. The probability (P) of arresting a crack is given by, $$P = f_{sp}^2 + 2[f_o f_{sp}(1 - f_{sp})] \tag{2}$$

where $f_o$ is the fraction of interfaces in the material which are unfavourably oriented to the applied stress axis (note that $f_o$ is strongly dependent on the grain shape and has a value of ⅓ for conventional equiaxed materials) and $f_{sp}$ is the fraction of special interfaces which are intrinsically resistant to cracking. The probability c of arresting a crack within a length L from the initiating surface is given by, $$(1 - c) = (1 - P)^{2L/d} \tag{3}$$

where d is the average grain size. The probability of crack arrest can be increased by three fundamental approaches:
(1) increasing the frequency of intrinsically resistant grain boundaries ($f_{sp}$)
(2) decreasing grain size (d), and
(3) modifying grain shape ($f_o$).

Intergranular corrosion can also compromise the integrity of a positive lead acid electrode by general loss of cross-sectional thickness arising from "grain dropping'. For any grain to be ejected from the matrix, all of its bounding grain boundaries must be fully compromised by corrosion. Assuming that 'special' grain boundaries are immune to corrosion, and considering a material comprised of hexagonal prism grains, it can be shown that the probability of arresting such a grain dropping process at any junction is given by, $$(1 - P) = (1 - f_{sp})^3 (1 - f_{sp}^3) \tag{4}$$

The probability (P) derived in eqn (4) can be applied with eqn (3), where it can be shown that, in a manner similar to intergranular cracking, decreasing grain size (d) and increasing special boundary frequency ($f_{sp}$) are expected to significantly increase resistance to section loss by intergranular corrosion.

The operating life of a lead acid battery can be considered to be inversely proportional to the probability of through-wall penetration at the minimum electrode dimension ($D_{cnt}$), by either an intergranular—corrosion or cracking mechanism. From eqns. 2, 3 and 4, and considering that intergranular degradation propagates simultaneously from the two surfaces bounding the minimum dimension (i.e., $D_{cnt}$=2L), the following expression 5 can be derived for determining the effect of microstructure (i.e., grain size and grain boundary character distribution) on the minimum electrode section thickness required to obtain a given cycle life (C)

$$D_{crit} + \frac{d * \ln(1-x) * C}{K * \ln(1-P)} \quad (5)$$

In this equation, X is the statistical certainty, and P is the probability of arresting the degradation process, which is obtained from eqn. (3) or eqn. (4) for intergranular-cracking and -corrosion processes, respectively. K is a constant which can be estimated from the typical performance of conventional lead-acid batteries. For example, in severe laboratory testing of typical SLI positive electrodes, a charge-discharge cycle life, C, of approximately 200 is observed with grids having a minimum cross-section of approximately 1 mm, average grain size, d, of 50 $\mu$m, and a microstructure consisting of approximately 15% special grain boundaries (fsp). Assuming a statistical certainty (X) of 99%, these conditions lead to K values of 408 cycles, and 48 cycles for intergranular cracking and corrosion processes, respectively.

Figure 2:
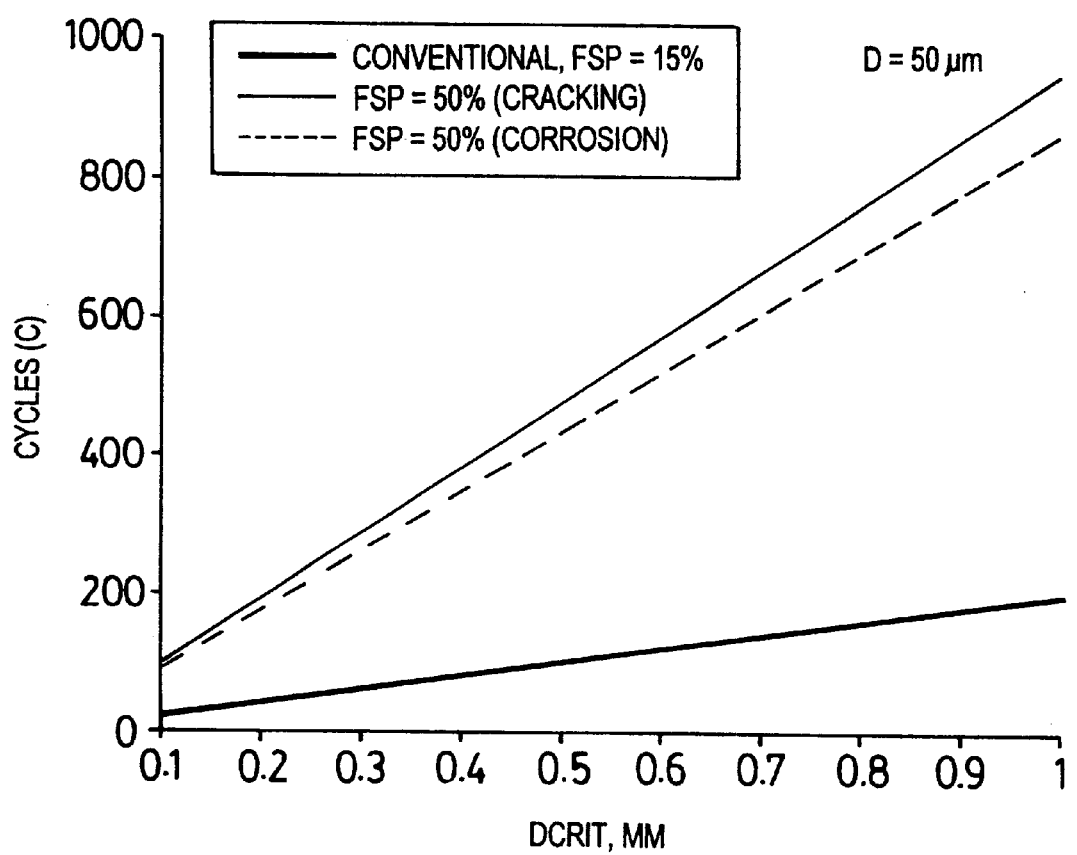
FIG. 2 is a graph showing variation of cycle life with a critical electrode dimension.

FIG. 2 summarizes the estimated improvements in lead-acid battery performance from increases in special grain boundary content as calculated from eqn (5) for material having a conventional grain size of 50 $\mu$m. As shown in this figure, significant improvements in cycle life are expected for both intergranular-cracking and corrosion dominated degradation processes, by increasing the population of special grain boundaries, $f_{sp}$. At conventional SLI positive electrode dimensions of 1 mm, increasing the special grain boundary population from that typically observed (i.e., 15%) to 50% is expected to result in approximately a 4—fold improvement in cycle life. Moreover, as shown in FIG. 2, this improvement in performance would allow the use of grids having a minimum dimension of as low as 0.2 mm, while still retaining the current performance of SLI batteries. Such a reduction in positive grid thickness would be expected to significantly reduce the size and weight of lead-acid batteries (1 mm positive grid accounts for 25% of total battery weight), or result in commensurate increases in energy density.

Through increasing the special grain boundary fraction in the metal, grain boundary engineering increases the resistance of the metal to crack propagation and strain deformation (creep) by altering the crystallographic structure of the metal. This is in contrast to previous efforts at providing improved components for lead-acid batteries, such as precipitation or age hardening, which were directed at changing the composition, size and organization of the microconstituents within the grains. Through a carefully controlled process of deformation and recrystallization, the special grain boundary fraction can be beneficially increased.

The method of the present Invention is based on the discovery that the special grain boundary fraction can be increased through careful selection of process parameters for deforming and then recrystallizing the lead or lead alloy. The specified steps may be repeated until the desired concentration of special grain boundaries is achieved. The deformation can take the form of drawing, stamping, rolling, pressing, extruding, expanding, forging or any other physical deformation. We have found that, for lead and some lead alloys, special grain boundary concentrations or fractions of greater than 50% can be achieved with only one deformation and recrystallization step; however, additional deformation and recrystallization steps may yield a more uniform product having a smaller overall average grain size. A smaller grain size increases the amount of special grain boundaries and thereby improves crack resistance.

Furthermore, as described above and as predicted from equation (5), decreasing the grain size beneficially reduces the required level of special grain boundary fraction necessary to show improved results through the present invention. Physical limitations on minimum grain size, though, generally dictate that special fractions of 50% or higher are required to receive improved characteristics with the present invention.

It has been discovered that there is a relationship between the recrystallization temperature, the amount of deformation per step, the temperature at which such deformation occurs, the amount of time at which the lead or lead alloy is held at the recrystallization temperature, the composition of the lead or lead alloy used and the resulting special grain boundary fraction resulting in the lead or lead alloy.

The temperature at which the lead is recrystallized is critical to the present invention. Typically, recrystallization will occur in a metal at temperatures over 0.5 Tm, where Tm is the absolute melting temperature of the metal in degrees Kelvin. For pure lead, it is well known that recrystallization can occur at ambient temperature. In the present invention, the temperature at which recrystallization occurs must be chosen so that the special grain boundary fraction is maximized. The temperature must not be so high, however, that excessive grain growth occurs. Moreover, the desired recrystallization temperature must be achieved within a relatively short period of time in order to prevent premature recovery, and in certain alloys, precipitation of secondary phases during prolonged heat-up, which can excessively harden the alloy and hinder the nucleation of new grains and grain boundaries.

Since small changes in the composition of the lead alloy can affect the recrystallization temperature and time required to optimize the special grain boundary concentration in the lead, trial and analysis must be used to determine the amount of deformation, annealing temperature and time, and the number of processing cycles which will maximize the special grain boundary fraction in a given composition of lead.

For commercially pure lead, special grain boundary concentrations of greater than 50% can be produced in one or more cycles comprised of induced deformations or strains in the range between 10% to 70% per step, and recrystallization at temperatures within the range of 150 degrees Celsius to 280 degrees Celsius for annealing times in the range of 10 seconds to 15 minutes.

For other lead alloys, we have discovered that these can be categorized as Pb—XY alloys, where X elements are comprised of the strong precipitate formers and Y elements are the weak or non-precipitating elements. The X elements are comprised of the Group I and Group II elements of the periodic table, which in terns of common and potential battery alloying constituents include: Li, Na, K, Rb, Cs, Fr, Be, Mg, Ca, Sr, Ba, and Ra. The Y elements are comprised of other common lead alloying constituents which include: Ag, Sn, Cu, Zn, As, and Bi.

For lead alloys where the cumulative concentration of X elements is less than 0.05 wt. %, and the cumulative concentration of Y elements is in the range of 0.5 to 5 wt. %, hereafter referred to as Class I alloys, then a single cycle of deformation or strain between 10% and 40% and recyrstallization at a temperature between 200° Celsius and 280° Celsius for a time in the range of 10 seconds to 10 minutes, followed by air cooling to ambient temperature, will yield a microstructure consisting of a special grain boundary content of greater than 50%.

For lead alloys where the cumulative concentration of X elements is greater than or equal to 0.05 wt. %, and the cumulative concentration of Y elements is in the range of 0.5 to 5 wt. %, hereafter referred to as Class II alloys, then two or more cycles of deformation or strain between 40% and 80% and recyrstallization at a temperature between 200° Celsius and 280° Celsius for a time in the range of 10 seconds to 10 minutes, followed by air cooling to ambient temperature, will yield a microstructure consisting of a special grain boundary content of greater than 50%.

In all cases, the specific recrystallization temperature and time must be optimized to achieve complete recrystallization. In cases where rapid heat-up rates are obtainable such as is achievable in salt baths and fluidized bed furnaces, annealing times can be reduced significantly.

The method of the present invention will now be illustrated by way of the following examples.

EXAMPLE #1

Strips of commercially pure lead, in an as cast condition, were subjected to six cycles each comprising a room temperature deformation step and a recrystallization step. The deformations were performed on a rolling mill and were limited to 20% reduction in thickness per step. Each recrystallization treatment was carried out at 160° C. for 15 minutes.

Figure 4A:
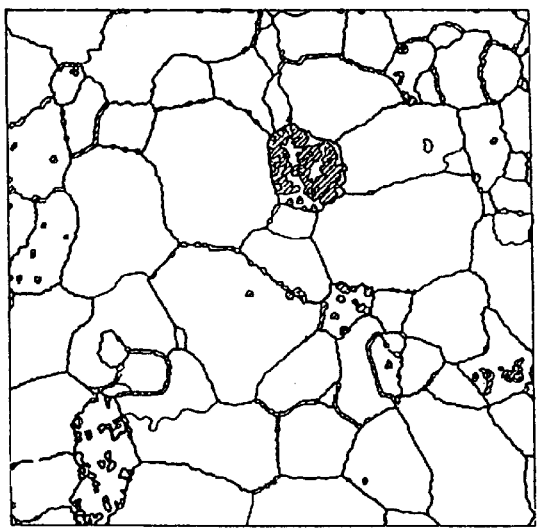
FIG. 4a is a map of special boundary character distribution in as cast pure lead, obtained by Orientation Imaging Microscopy.
Figure 4B:
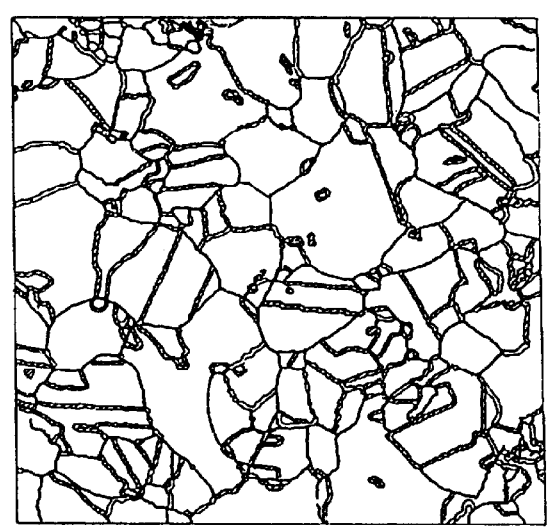
FIG. 4b is a map of special boundary character distribution in pure lead processed by the method of the present invention, obtained by Orientation Imaging Microscopy.

Each sample of grain boundary engineered material and control was analyzed to determine the percentage of special grain boundaries. The results are summarised in Table 1, at the end of the description. As can be seen from Table 1, for pure lead, the concentration of special grain boundaries in the as cast material was 16.5%. The concentration of special grain boundaries in the grain boundary engineered material was 64.7%. Clearly, the processing method dramatically increases the number of special grain boundaries. The microstructures of the cast and GBE-processed materials are depicted in FIG. 4.

Figure 3:
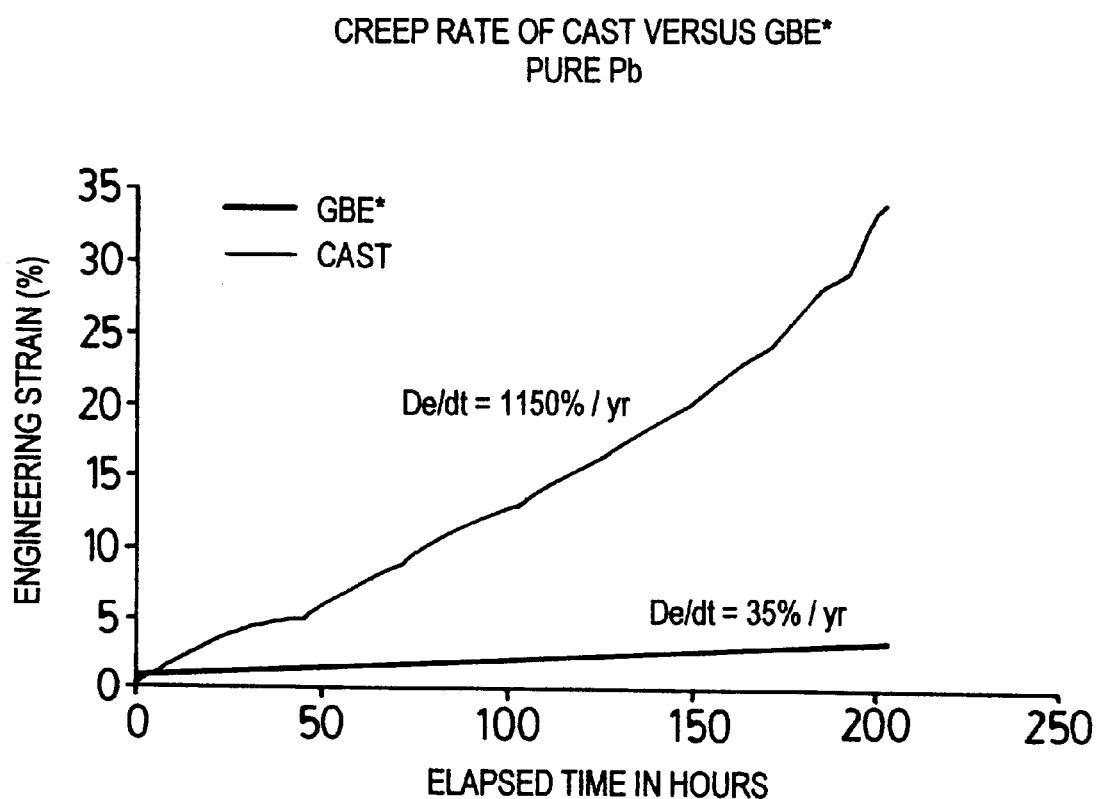
FIG. 3 is a graph showing a comparison of the creep rate for pure as cast lead and the creep rate of pure lead processed by the method of the present invention.

To measure the samples resistance to strain deformation, which is directly related to positive electrode growth in a lead-acid battery, standard ASTM E139 creep tests were performed. Each sample was subjected to a strain of 4.8 MPa over a period of several hours at room temperature The amount of deformation, in millimeters, was then plotted as a function of time. The results are summarised in FIG. 3. The rate of strain deformation over time for the as cast material was calculated as 1150% per year. By comparison, the rate of strain deformation for the grain boundary engineered material was found to be only 35% per year. The grain boundary engineered material processed by the embodiments of the present invention showed greatly increased resistance to strain deformation. It should be noted that this result cannot be attributed to precipitation effects as outlined in the work of Tilman and Myers as the commercially pure lead does not contain any precipitate forming elements, and further underscores the novelty of this present invention.

EXAMPLE #2

A series of commercial lead alloys of the Class II type previously described, were obtained in a conventional cast condition in the form of strip. These strips were subsequently processed using the techniques described in the present invention. The specific alloys and processing conditions are summarized as follows.

Figure 5:
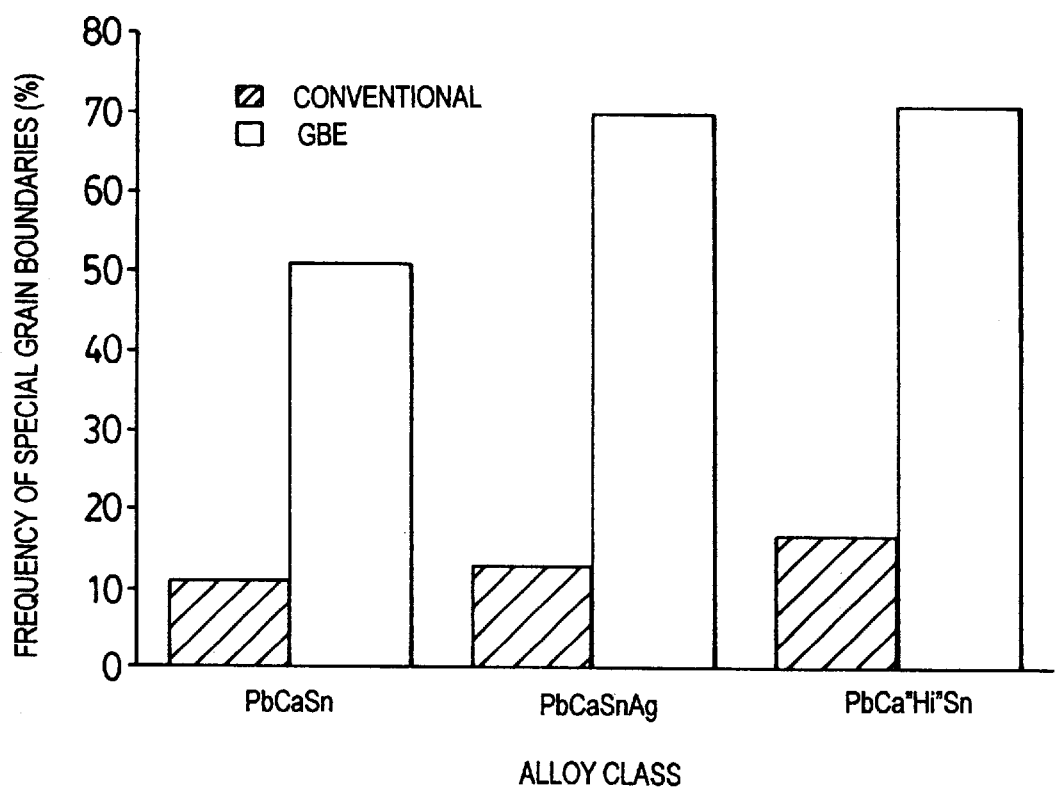
FIG. 5 is a bar graph summarizing the increases in special grain boundary content for a range of lead-alloy compositions achieved using the method of the present invention.

A Pb-0.073 wt % Ca-0.07 wt % Sn alloy (Class II) was processed by three cycles each comprised of cold rolling to achieve a 40% reduction in thickness, annealing at 270 degrees Celsius for 10 minutes in air followed by air cooling. The resulting microstructural improvement in terms of special grain boundary content is summarized in FIG. 5 (identified as PbCaSn in FIG. 5). The special grain boundary content was increased from 17% in the as-cast starting material, to 51% in the material processed by the method described.

A Pb-0.065 wt % Ca-0.07 wt % Sn 0.03 wt % Ag alloy (Class II) was processed by two cycles each comprised of cold rolling to achieve a 40% reduction in thickness, annealing at 250 degrees Celsius for 10 minutes in air followed by air cooling. The resulting microstructural improvement in terms of special grain boundary content is summarized in FIG. 5 (identified as PbCaSnAg in FIG. 5). The special grain boundary content was increased from 10% in the as-cast starting material, to 70% in the material processed by the method described.

A Pb-0.073 wt % Ca-1.4 wt % Sn alloy (Class II) was processed by two cycles each comprised of cold rolling to achieve a 40% reduction in thickness, annealing at 250 degrees Celsius for 10 minutes in air followed by air cooling. The resulting microstructural improvement in terms of special grain boundary content is summarized in FIG. 5 (identified as PbCa"Hi"Sn in FIG. 5). The special grain boundary content was increased from 17% in the as-cast starting material, to 70% in the material processed by the method described.

The performance of these alloys in both the as-cast and GBE-processed conditions as described above were evaluated in industry standard tests whereby grids of 0.59 mm thickness were formed from the strip materials. Corrosion tests were conducted by static polarization in a solution of 1.27 specific gravity sulfuric acid at 70 degrees Celsius and polarized at an overpotential of 200 mV for 20 days. Grid electrodes were weighed to the nearest milligram prior to and following exposure to the solution to establish mass loss due to corrosion. Cycling tests were conducted with pasted grids assembled into individual battery cells. Grid weights to the nearest milligram were established prior to pasting. Positive grids were cycled between 0.8 V and 1.4V at a rate of two cycles per day for 35 days in a solution of 1.27 specific gravity sulfuric acid at 70 degrees Celsius. Upon completion of the test, grids were cleaned of residual paste, and reweighed to the nearest milligram. Also, grid growth susceptibility was established by digitally scanning the area of the grids both prior to and following the test exposure.

Figure 6A:
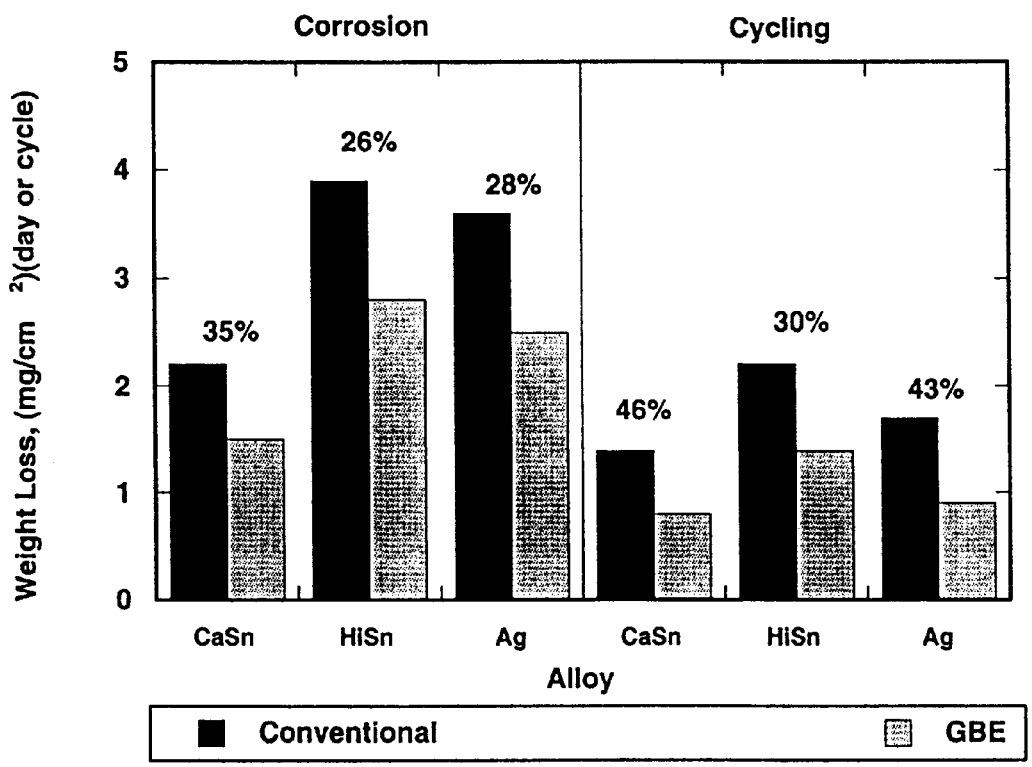
FIG. 6 is a bar graph summarizing the improvements in corrosion and electrode growth for a range of lead-alloy compositions achieved using the method of the present invention.
Figure 6B:
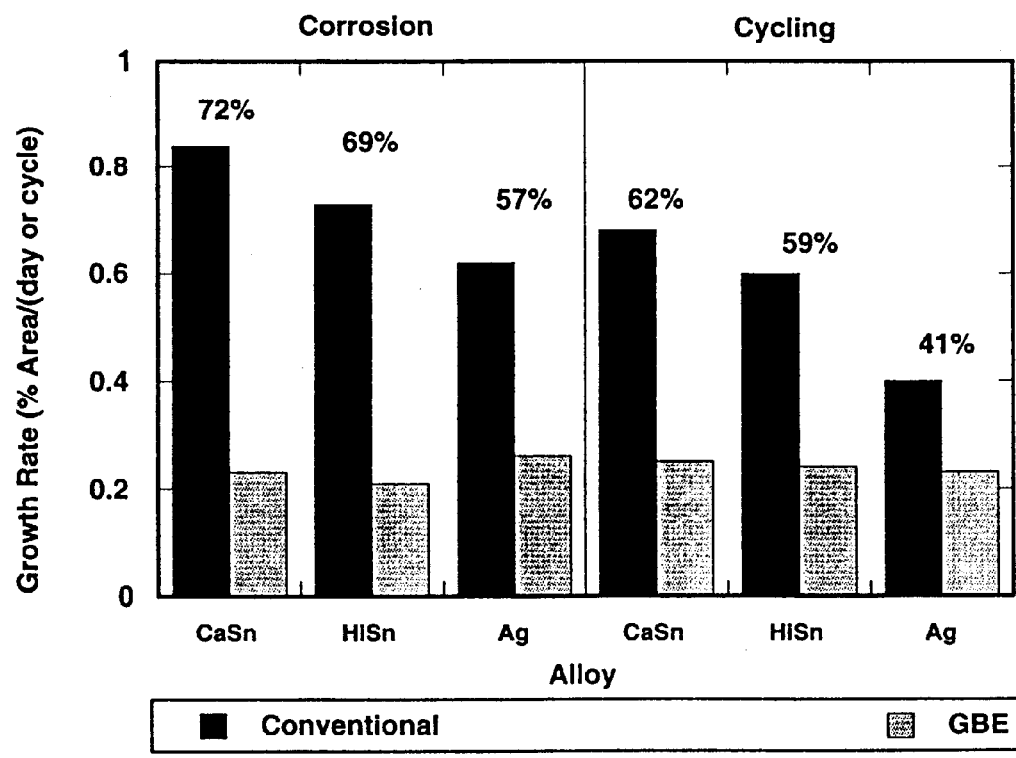

The performance of the processed Class II alloys (GBE) relative to their conventional cast counterparts are summarized in FIG. 6. In all cases, the alloys processed according to the present invention displayed significantly reduced corrosion and growth rates relative to their cast counterparts.

EXAMPLE #3

A Pb-0.03 wt % Ca-0.7 wt. % Sn 0.06 wt % Ag alloy, representative of a Class I alloy was produced using a commercial rotary net shape casting process. The cast strip of 0.86–0.89 mm thickness was subsequently subjected to a single processing cycle comprised of approximately 20% cold tensile strain (room temperature), and heat treatment in an air convection oven at a temperature of 250 degrees Celsius for 5 minutes followed by cooling to ambient temperature. The strain was introduced at room temperature solely through the grid expansion process and was controlled by the tool die geometry (i.e., diamond height of expanded mesh). For comparison purposes a wrought strip was produced without subsequent recrystallization heat treatment. In this case, cast strip of 1.72 mm thickness was cold rolled by 50% and similarly expanded to mesh. The proportion of special grain boundaries present in the as-cast, wrought, and single step GBE processed materials were found to be 16.0%, 15.4% and 64.4%, respectively.

Figure 7A:
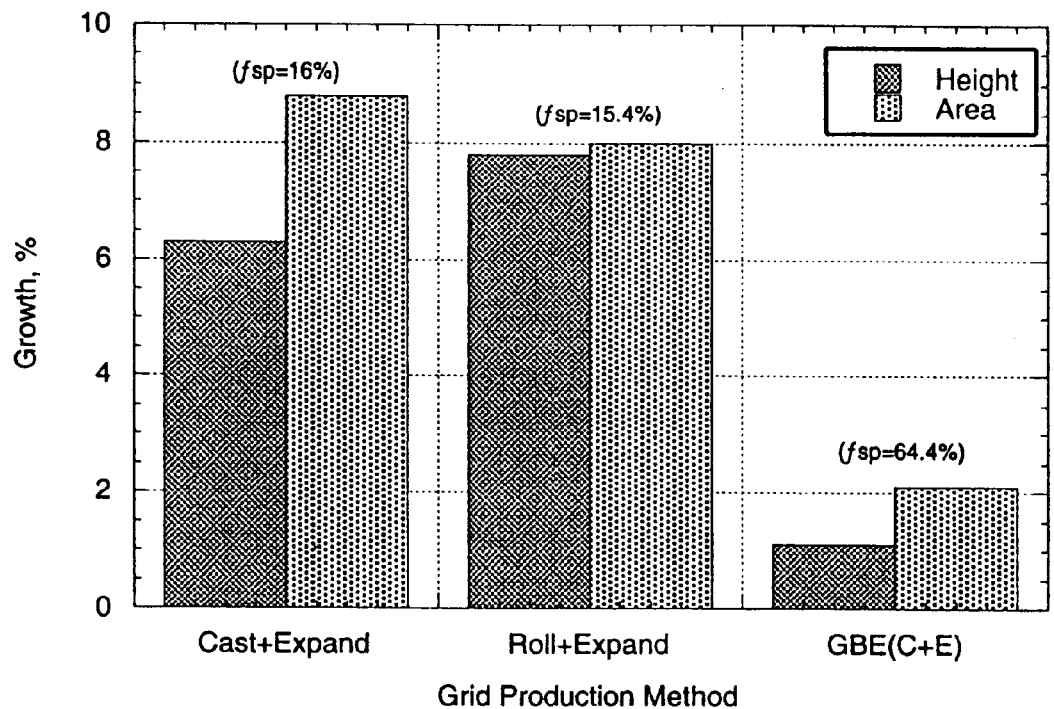
FIG. 7 is a bar graph summarizing the relative corrosion and electrode growth performance for a Pb-0.03Ca-0.7Sn-0.06Ag alloy in the cast, wrought, and wrought and recrystallized condition; the latter achieved using the method of the present invention.
Figure 7B:
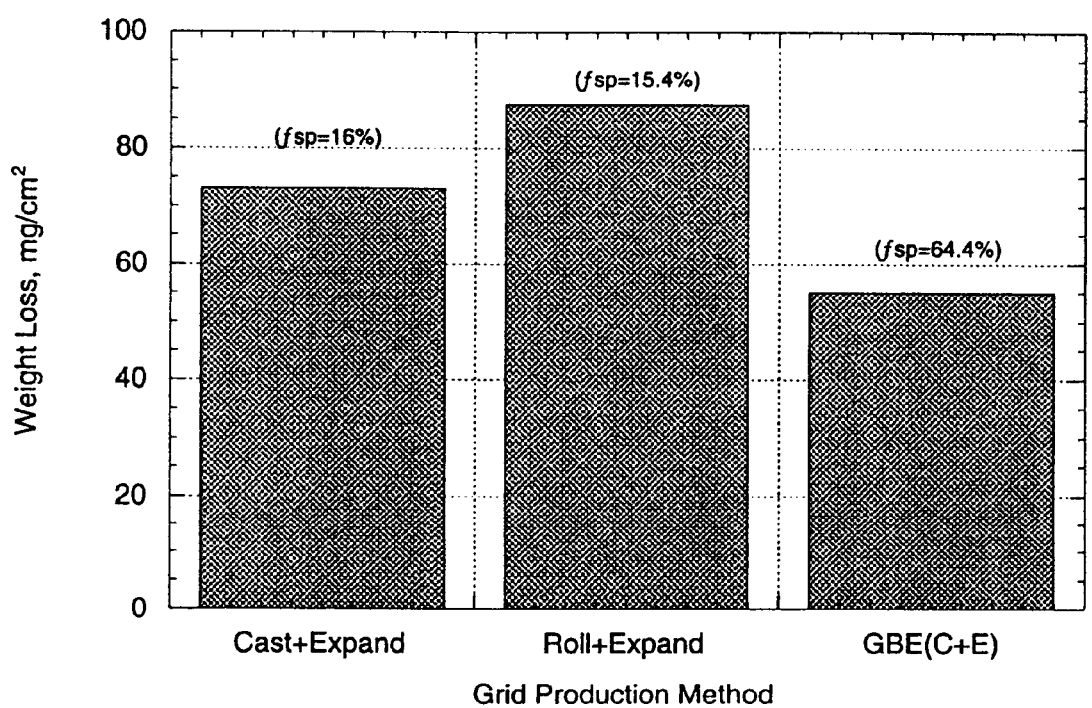

The relative corrosion and growth performance of these materials was evaluated in cycling tests as described in Example 2 at a higher temperature of 75 degrees Celsius for 20 days. The results are summarized in FIG. 7 which shows that the material processed according to the present invention displays significantly reduced corrosion susceptibility, particularly with reference to the wrought material. In terms of growth, the GBE material significantly outperforms both its cast and wrought counterparts.

TABLE 1

Relative percentage of special grain boundaries

| | Pure Pb | |
|---|---|---|
| Σ | As Cast | GBE |
| 1 | 2.1 | 8.9 |
| 3 | 11.4 | 40.4 |
| 5 | 0.6 | 2.6 |
| 7 | 0.2 | 0.3 |
| 9 | 1.7 | 9.9 |
| 11 | 0.1 | 0.5 |
| 13 | — | 0.2 |
| 15 | — | 0.2 |
| 17 | — | 0.2 |
| 19 | — | 0.2 |
| 21 | — | 0.1 |
| 23 | — | 0.1 |
| 25 | 0.2 | 0.1 |
| 27 | 0.2 | 1 |
| 29 | — | 0.4 |
| Random(Σ > 29) | 83.5 | 35.3 |
| Special (Σ ≦ 29) | 16.5 | 64.7 |

The invention having been so described, certain modifications and adaptations will be obvious to those skilled in the art. The invention included all such modifications and adaptations which fall within the scope of the appended claims.

I claim:

1. Recrystallized lead or lead alloy having a special grain boundary percentage wherein the percentage of special grain boundaries comprises at least 50% of the total grain boundaries thereof; said lead or lead alloy having a hardness after recrystallization which is not greater than the hardness of said lead or lead alloy before recrystallization; and said alloy consisting essentially of lead alloyed with Ag, Sn, Cu, Zn, As, Bi, Li, Na, K, Rb, Cs, Fr, Be, Mg, Ca, Sr, Ba or Ra.

2. A positive lead-acid battery electrode formed from the recrystallized lead or lead alloy of claim 1.

3. The electrode of claim 2 which is formed from said lead alloy wherein said lead alloy is lead alloyed with Ag, Sn, Cu, Zn, As or Bi in a cumulative concentration in the range of 0.5–5 wt. %; and/or said lead alloy is lead alloyed with Li, Na, K, Rb, Cs, Fr, Be, Mg, Ca, Sr, Ba or Ra in a cumulative concentration of less than 0.05 wt. %.

4. The electrode of claim 2 which is formed from said lead alloy wherein said lead alloy is lead alloyed with Ag, Sn, Cu, Zn, As or Bi in a cumulative concentration in the range of 0.5 to 5 wt. %; and/or said lead alloy is lead alloyed with Li, Na, K, Rb, Cs, Fr, Be, Mg, Ca, Sr, Ba or Ra in a cumulative concentration of greater than or equal to 0.05 wt. %.

5. The electrode of claim 2 wherein said lead or lead alloy as an average grain size which is less than 100 microns.

6. The electrode of claim 5 wherein said grain size is less than 50 microns.

7. The electrode of claim 2, wherein the minimum dimension, Dcrit, of the electrode has been determined in accordance with the following equation:

$$D_{crit} = \frac{d * ln(1-x) * C}{K * ln(1-P)}$$

where: C is the desired charge-discharge cycles over the battery life; d is the average grain size in millimetres; X represents the statistical certainty; P is defined, on the basis of intergranular cracking or corrosion control, as either $$P = f_{sp}^2 + 0.66 f_{sp}(1-f_{sp}), \text{ or, } (1-) = (1-f_{sp})^3 (1-f_{sp}^3), \text{ respectively}$$

where: fsp is the fraction of special grain boundaries in the electrode microstructure; and K is a constant based upon the typical life cycle of lead-acid batteries and takes the values of approximately 400 cycles and 50 cycles, for intergranular cracking and intergranular corrosion processes, respectively.

8. The electrode of claim 2 wherein said lead or lead alloy has a crystallographic microtexture which is substantially random.

9. Recrystallized lead or lead alloy having a special grain boundary percentage wherein the percentage of special gram boundaries comprises at least 50% of the total grain boundaries thereof; said alloy consisting essentially of lead and a metal alloyed therewith, said metal alloyed with said lead being selected from the group consisting of Ag, Sn, Cu, Zn, As, Bi, Li, Na, K, Rb, Cs, Fr, Be, Mg, Ca, Sr, Ba or Ra.

10. A positive lead-acid battery electrode formed from the recrystallized lead or lead alloy of claim 9.

11. The electrode of claim 10 which is formed from said lead alloy wherein said lead alloy is lead alloyed with Ag, Sn, Cu, Zn, As or Bi in a cumulative concentration in the range of 0.5–5 wt. %; and/or said lead alloy is lead alloyed with Li, Na, K, Rb, Cs, Fr, Be, Mg, Ca, Sr, Ba or Ra in a cumulative concentration of less than 0.05 wt. %.

12. The electrode of claim 10 which is formed from said lead alloy wherein said lead alloy is lead alloyed with Ag, Sn, Cu, Zn, As or Bi in a cumulative concentration in the range of 0.5 to 5 wt. %; and/or said lead alloy is lead alloyed with Li, Na, K, Rb, Cs, Fr, Be, Mg, Ca, Sr, Ba or Ra in a cumulative concentration of greater than or equal to 0.05 wt. %.

13. The electrode of claim 10 wherein said lead or lead alloy as an average grain size which is less than 100 microns.

14. The electrode of claim 13 wherein said grain size is less than 50 microns.

15. The electrode of claim 10, wherein the minimum dimension, Dcrit, of the electrode has been determined in accordance with the following equation:

$$D_{crit} = \frac{d * ln(1-x) * C}{K * ln(1-P)}$$

where: C is the desired charge-discharge cycles over the battery life; d is the average grain size in millimetres; X represents the statistical certainty; P is defined, on the basis of intergranular cracking or corrosion control, as either $$P = f_{sp}^2 + 0.66 f_{sp}(1-f_{sp}), \text{ or, } (1-P) = (1-f_{sp})^3 (1-f_{sp}^3), \text{ respectively}$$

where: fsp is the fraction of special grain boundaries in the electrode microstructure; and K is a constant based upon the typical life cycle of lead-acid batteries and takes the values of approximately 400 cycles and 50 cycles, for intergranular cracking and intergranular corrosion processes, respectively.

16. The electrode of claim 10 wherein said lead or lead alloy has a crystallographic microtexture which is substantially random.

17. Recrystallized lead or lead alloy positive lead-acid battery electrodes which have been processed to improve at least one of the properties of (i) creep, (ii) intergranular cracking and (iii) intergranular corrosion resistance, by subjecting said lead or lead alloy to at least one cycle consisting of the sequential steps of:
   a. cold working the lead or lead alloy by an amount of approximately 10–80%; and
   b. annealing the lead or lead alloy at a temperature m the range of 150–280° C. for a period in the range of from 10 seconds to 20 minutes, sufficient to effect recrystallization of the lead or lead alloy and a substantial increase in the concentration of special grain boundaries thereof
   wherein the percentage of special grain boundaries comprises at least 50% of the total grain boundaries thereof; and said lead alloy consists essentially of lead and a metal alloyed therewith, said metal alloyed with said lead being selected from the group consisting of Ag, Sn, Cu, Zn, As, Bi, Li, Na, K, Rb, Cs, Fr, Be, Mg, Ca, Sr, Ba or Ra.

18. Recrystallized lead alloy positive lead-acid battery electrodes as claimed in claim 17, wherein said lead alloy is lead alloyed with Ag, Sn, Cu, Zn, As or Bi in a cumulative concentration in the range of 0.5 to 5 wt. %; and/or said lead alloy is lead alloyed with Li, Na, K, Rb, Cs, Fr, Be, Mg, Ca, Sr, Ba or Ra in a cumulative concentration of less than 0.05 wt. %, and
   wherein said lead alloy has been subjected in step (a) to cold working by an amount in the range of 10 to 40% and in step (b) to annealing at a temperature in the range of 200–280° C. for a period from 10 seconds to 20 minutes is carried out in step (b).

19. Recrystallized lead alloy positive lead-acid battery electrodes as claimed in claim 17, wherein said lead alloy is lead alloyed with Ag, Sn, Cu, Zn, As or Bi in a cumulative concentration in the range of 0.5 to 5 wt. % and/or said lead alloy is lead alloyed with Li, Na, K, Rb, Cs, Fr, Be, Mg, Ca, Sr, Ba or Ra in a cumulative concentration of greater than or equal to 0.05.wt. %, and
   wherein said lead alloy has been subjected to at least two of said cycles in which cold working by an amount in the range of approximately 40–80% is applied in step (a) and annealing at a temperature in the range of 200–280° C. for a period of time in the range of from 10 seconds to 20 minutes is carried out in step (b).

20. Recrystallized lead or lead alloy positive lead-acid battery electrodes as claimed in claim 17, in which the average grain size is less than 100 microns.

21. Recrystallized lead or lead alloy positive lead-acid battery electrodes as claimed in claim 17, in which the average grain size is less than 50 microns.

22. Recrystallized lead or lead alloy positive lead-acid battery electrodes as claimed in claim 17, wherein the minimum dimension, Dcrit, of the electrode has been determined in accordance with the following equation:

$$D_{crit} = \frac{d * \ln(1-x) * C}{K * \ln(1-P)}$$

where: C is the desired charge-discharge cycles over the battery life; d is the average grain size in millimetres; X represents the statistical certainty; P is defined, on the basis of intergranular cracking or corrosion control, as either $$P = f_{sp}^2 0.66 f_{sp}(1-f_{sp}), \text{ or, } (1-P) = (1-f_{sp})^3 (1-f_{sp}^3), \text{ respectively}$$

where: fsp is the fraction of special grain boundaries in the electrode microstructure; and K is a constant based upon the typical life cycle of lead-acid batteries and takes the values of approximately 400 cycles and 50 cycles, for intergranular cracking and intergranular corrosion processes, respectively.

23. Recrystallized lead or lead alloy positive lead-acid battery electrodes as claimed in claim 17 wherein the crystallographic microtexture of the lead or lead alloy is substantially random.

* * * * *